(12) United States Patent
Shimada et al.

(10) Patent No.: US 6,293,381 B1
(45) Date of Patent: Sep. 25, 2001

(54) HYDRAULIC POWER TRANSMISSION JOINT

(75) Inventors: Kazuhisa Shimada; Tadahiko Kato, both of Shizuoka; Toshiharu Takasaki, Kanagawa; Hirotaka Kusukawa, Machida; Shigeo Murata, Kanagawa, all of (JP)

(73) Assignees: Fujiunivance Co., Kosai; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/556,835

(22) Filed: Apr. 21, 2000

(30) Foreign Application Priority Data

Apr. 26, 1999 (JP) .................................................. 11-117911

(51) Int. Cl.$^7$ .................................................. F16O 31/02
(52) U.S. Cl. .................... 192/59; 192/103 F; 192/110 B
(58) Field of Search .................................. 192/59, 103 F, 192/110 B, 54.3; 464/24, 27; 60/413; 91/485, 499

(56) References Cited

U.S. PATENT DOCUMENTS 5,103,642 * 4/1992 Suzuki et al. ........................ 60/413
5,297,994 * 3/1994 Suzuki et al. ........................ 464/27

FOREIGN PATENT DOCUMENTS 3-38433-A * 2/1991 (JP) .
5-321951-A * 12/1993 (JP) .

* cited by examiner

Primary Examiner—Richard M. Lorence
(74) Attorney, Agent, or Firm—Wenderoth, Lind & Ponack, L.L.P.

(57) ABSTRACT

An axially extending extension is formed on a bearing retainer provided adjacent to a valve block of a joint and press-fitted into the interior of a housing. The extension has at its outer peripheral end a bearing by way of which the bearing retainer is rotatably supported by a differential gear case located outside thereof. This allows moment arising from rotational secondary torque received by the housing to be transmitted from the bearing retainer extension via the bearing to the outside differential gear case, thereby preventing the moment from acting on a main shaft which is a centrally located output shaft.

5 Claims, 8 Drawing Sheets

HYDRAULIC POWER TRANSMISSION JOINT

BACKGROUND OF THE INVENTION

1. Field of the Invention

The present invention relates generally to a hydraulic power transmission joint for use in distribution of vehicle driving powers, and more particularly to a hydraulic power transmission joint aiming to prevent a lowering of torque arising from oil leakage and thus from hydraulic pressure reduction.

2. Description of the Related Arts

Conventional hydraulic power transmission joints are known from e.g., U.S. Pat. Nos. 5,706,658 and 5,983,635.

FIG. 1 illustrates an example of a hydraulic power transmission joint being currently developed by the inventors of the present application on the basis of the above Patents, and FIG. 2 is an enlarged view of the major part thereof. Referring to FIGS. 1 and 2, a propeller shaft 101 acting as an input shaft is coupled to a companion flange 102 into which is fixedly inserted a housing shank 104 having a cam face 103 formed on its inner face. A housing 105 is secured by welding to the housing shank 104. The housing shank 104 is supported via a front bearing 106 by a differential gear case 107. A main shaft 108 acting as an output shaft connects with a drive pinion gear 109 associated with a rear differential gear. A rotor 110 is fitted via splines to the main shaft 108 and is rotatably housed in the housing 105. The main shaft 108 is supported via a rear bearing 111 by the differential gear case 107. The rotor 110 is provided with a plurality of axially extending plunger chambers 112 which accommodate plungers 113 reciprocatively under a pressing force of return springs 114, with the plungers 113 being operated by the cam face 103 upon the relative rotations between the two shafts. The plunger 113 has a one-way valve 115 for intake disposed at its head. The rotor 110 is formed with a discharge hole 116 leading to the plunger chambers 112. The discharge hole 116 is provided with a one-way valve 117 for discharge. A valve block 118 coupled to the rotor 110 has a high-pressure chamber 119 leading to the discharge hole 116 and has an orifice 120 acting as flow resistance generating means for generating a flow resistance by the flow of oil discharged by the operation of the plungers. A bearing retainer 121 is securely press-fitted to the housing 105 and is positioned by a snap ring 122. Needle bearings 123 and 124 are interposed between the bearing retainer 121 and the valve block 118 and between the bearing retainer 121 and the main shaft 108, respectively. A thrust washer 125 is further provided between the bearing retainer 121 and the main shaft 108. An accumulator piston 126 is provided for absorbing thermal expansion and contraction of oil residing within the joint.

In such a hydraulic power transmission joint, however, the bearing retainer 121 is supported via the needle bearing 124 by the main shaft 108, whereas the bearing retainer 121 presses the main shaft 108 by way of the thrust washer 125, with the result that rotational secondary torque and thrust-up load input from the propeller shaft 101 enters the interior of the joint and the rotational secondary torque becomes a moment separating the valve block 118 from the rotor 110, allowing a leakage of oil through the gap therebetween, which disadvantageously results in a lowering of toque. The thrust-up load is received by the main shaft 108 while the rotational difference between the input and output is absorbed by way of the thrust waster 125, with the result that abrasions and noises may take place.

More specifically, in FIGS. 1 and 2, the rotational secondary torque is input from the propeller shaft 101 as indicated by an arrow A, passes through the companion flange 102, the front bearing 106, the housing shank 104 and the housing 105 and enters the bearing retainer 121 as indicated by arrows B, C, D, E and F, after which it passes through the needle bearing 124 and acts on the main shaft 108. Via the same route, the thrust-up load enters the bearing retainer 121 and presses the thrust waster 125 to act on the main shaft 108.

Description will then be made of a mechanism of leakage of oil through the gap between the rotor 110 and the valve block 118 as a result of input of such a rotational secondary torque. Referring to FIG. 3, a hydraulic power transmission torque 127 is coupled to a differential gear 128. Rear wheels 129 and 130 are disposed on opposed sides of the differential gear 128. An arrow T indicates an engine torque of the propeller shaft 101. The engine torque T results in a rotational secondary torque as indicated by an arrow Tsin θ input to the hydraulic power transmission joint 127. When the rotational secondary torque enters the hydraulic power transmission joint 127, the main shaft 108 of the joint 127 is subjected as in FIG. 4 to a bending force due to a reaction force from the differential gear 128 in the tire lock status as indicated by arrows H of the rear wheels 129 and 130. For this reason, the hydraulic power transmission joint 127 attempts to tilt as indicated by a chain double-dashed line. In effect, however, the hydraulic power transmission joint 127 results by no means in the status of the chain double-dashed line, but instead as in the diagrammatic view of FIG. 5 the housing 105 and the housing shank 104 tend to have a counterclockwise tilt due to a degree of freedom of vertical movement of the propeller shaft 101 in the attached condition. As a result, the rotor 110 becomes tilted relative to the main shaft 108 as shown in FIGS. 6 and 7. In the normal status where input of the rotational secondary torque is absent, the rotor 110 is not tilted relative to the main shaft 108 as in FIG. 8 but remains parallel. Once the rotational secondary torque is input, however, the rotor 110 becomes tilted relative to the main shaft 108 as in FIGS. 6 and 7, resulting in a separation between the rotor 110 and the valve block 118. For this reason, oil may often leak through the gap between the valve block 118 and the rotor 110 and the hydraulic pressure may be reduced with lowering of the torque.

SUMMARY OF THE INVENTION

It is therefore the object of the present invention to provide a hydraulic power transmission joint capable of suppressing any leakage of oil through the gap between the valve block and the rotor, thereby preventing occurrence of a lowering of torque arising from a reduction of hydraulic pressure, as well as preventing occurrence of abrasions and noises.

According to a first aspect of the present invention there is provided a hydraulic power transmission joint disposed between an input shaft and an output shaft which are capable of relative rotations, for transmitting torque depending on rotational-speed differences between the two shafts, the hydraulic power transmission joint having a housing coupled to the input shaft and having a cam face formed on the inner side of the housing; a rotor coupled to the output shaft and rotatably housed in the housing, the rotor including a plurality of axially extending plunger chambers; a plurality of plungers each accommodated reciprocatively under a pressing force of a return spring in each of the plurality of plunger chambers, the plurality of plungers being operated by the cam face upon relative rotations between the two shafts; a discharge hole formed in the rotor so as to communicate with the plunger chambers; and a valve block having a high-pressure chamber which is in communication with the discharge hole, the valve block having an orifice which generates a flow resistance by the flow of oil discharged by the action of the plungers; wherein the hydraulic power transmission joint comprises a bearing retainer provided adjacent to the valve block and having the outer periphery press-fitted into the interior of the housing, the bearing retainer having on its inside an extension which extends in the axial direction of the output shaft; and a bearing by way of which the outer periphery at the terminal end of the extension of the bearing retainer is rotatably supported on the internal side of a differential gear case.

In this case, the input shaft connecting with the housing is a propeller shaft extending from a front differential gear, and the output shaft connecting with the rotor is a main shaft fitted with a drive gear of a rear differential gear.

According to the present invention having such a configuration, the axially extending extension is formed on the bearing retainer provided adjacent to the valve block of the joint and press-fitted into the interior of the housing, with the differential gear case bearing being provided on the outer periphery of the extension so that the bearing retainer can be supported via the bearing by the differential gear case, whereby the rotor is prevented from becoming tilted relative to the main shaft in spite of reception of the rotational secondary torque, with the result that there occurs no moment acting to separate the rotor from the valve block, preventing any leakage of oil through the gap between the rotor and the valve block leading to a reduction of hydraulic pressure, as well as preventing any lowering of the torque. Furthermore, the thrust-up load is transmitted from the bearing retainer which is a member rotating jointly with the housing to the rear bearing and does not act on the main shaft, thereby making it possible to prevent any occurrence of abrasions and noises.

According to a second aspect of the present invention, there is provided a hydraulic power transmission joint disposed between an input shaft and an output shaft which are capable of relative rotations, for transmitting torque depending on rotational-speed differences between the two shafts, the hydraulic power transmission joint having a housing coupled to the input shaft and having a cam face formed on the inner side of the housing; a rotor coupled to the output shaft and rotatably housed in the housing, the rotor including a plurality of axially extending plunger chambers; a plurality of plungers each accommodated reciprocatively under a pressing force of a return spring in each of the plurality of plunger chambers, the plurality of plungers being operated by the cam face upon relative rotations between the two shafts; a discharge hole formed in the rotor so as to communicate with the plunger chambers; and a valve block having a high-pressure chamber which is in communication with the discharge hole, the valve block having an orifice which generates a flow resistance by the flow of oil discharged by the action of the plungers, wherein the hydraulic power transmission joint comprises a first bearing retainer provided adjacent to the valve block; a first bearing by way of which the inner periphery of the first bearing retainer is rotatably supported on the output shaft; a second bearing retainer following the first bearing retainer and having the outer periphery press-fitted into the interior of the housing, the second bearing retainer having on its inside an extension which extends in the axial direction of the output shaft; and a second bearing by way of which the outer periphery at the terminal end of the extension of the second bearing retainer is rotatably supported on the internal side of a differential gear case.

Herein, the input shaft connecting with the housing is a propeller shaft extending from a front differential gear, and the output shaft connecting with the rotor is a main shaft fitted with a drive gear of a rear differential gear. The hydraulic power transmission joint further comprises an accumulator piston disposed between the first bearing retainer and the second bearing retainer, for absorbing a variation in volume arising from heat of oil.

In this another mode of the present invention, the second bearing retainer having the axially extending extension is further provided in addition to the first bearing retainer provided adjacent to the valve block and press-fitted into the interior of the housing, with the extension of the second bearing retainer having on its outer periphery the second bearing by way of which the second bearing retainer can be supported by the differential gear case, whereby there can be prevented any oil leakage through the gap between the rotor and the valve block leading to a reduction of hydraulic pressure and thus to a lowering of torque, as well as any occurrence of abrasions and noises.

The above and other objects, aspects, features and advantages of the present invention will become more apparent from the following detailed description with reference to the accompanying drawings in which the same or like reference numerals designate the same or corresponding elements throughout several views.

DETAILED DESCRIPTION OF THE PREFERRED EMBODIMENTS

Figure 9:
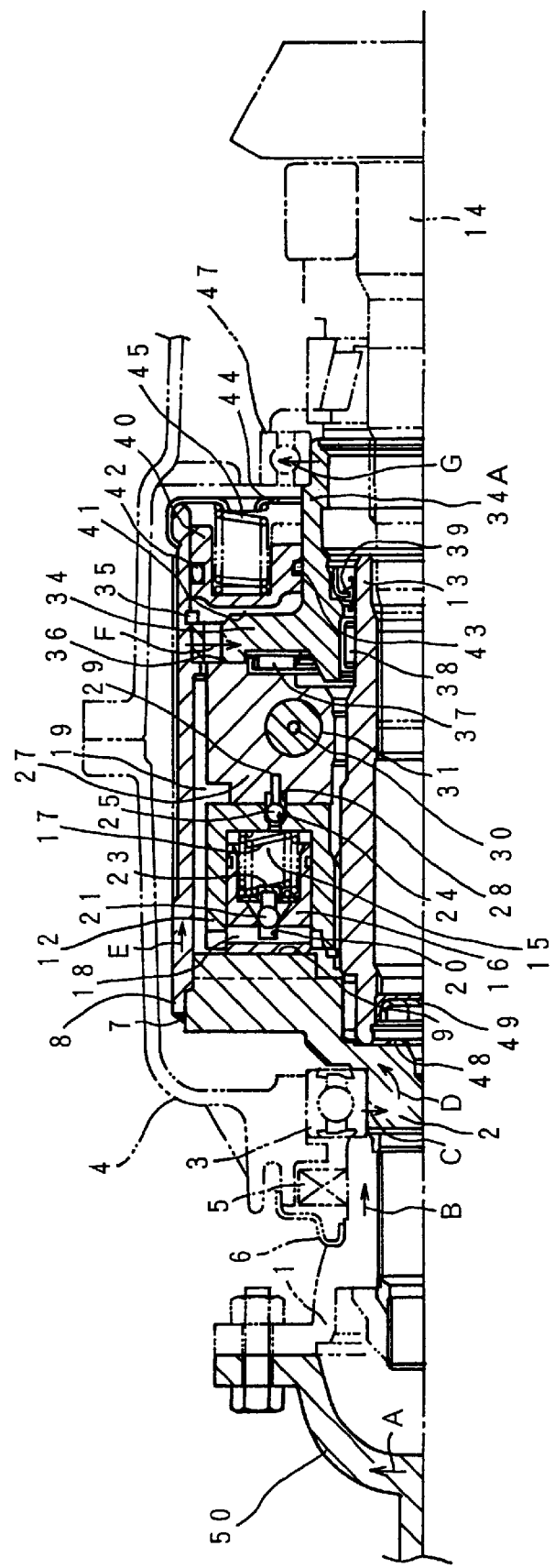
FIG. 9 is an axial half section of an embodiment of the present invention.

FIG. 9 is an axial half sectional view of an embodiment of the present invention. A companion flange 1 is coupled to a propeller shaft 50 acting as a front wheel input shaft (input shaft). A housing shank 2 is inserted into the companion flange 1 and is spline fitted to the latter. The housing shank 2 has on its outer periphery a front bearing 3 by way of which the housing shank 2 is supported on a differential gear case 4. Between the differential gear case 4 and the companion flange 1 are provided a seal member 5 and a cover 6 which prevent in cooperation an entrance of dusts or other foreign particles and an outflow of differential gear oil. A housing 8 is secured at a weld 7 to the housing shank 2 and has on its inner side surface a cam face 9 having two or more raised portions. The housing shank 2 serves as a cam by this cam face 9. A rotor 12 is rotatably housed in the housing 8 and engages with a main shaft 13 acting as an output shaft, for rotations in conjunction therewith. From the right side, the main shaft 13 fixedly receives a drive pinion gear 14 associated with a rear differential gear so that the main shaft 13 can rotate jointly with the drive pinion gear 14. The rotor 12 is provided with a plurality of axially extending plunger chambers 15 which accommodate a plurality of plungers 16 slidably by way of return springs 17. An intake passage 18 is formed toward the head of the plunger 16 and leads to a low-pressure chamber 19. The intake passage 18 and the plunger chamber 15 communicate with each other via a communication hole 20 adapted to be opened or closed by a one-way valve block 21 for intake in the form of a ball. The interior of the plunger chamber 15 is formed with a valve seat on which the one-way valve block 21 is seated. A check plug 23 is disposed on the stepped portion of the valve seat, with a check spring not shown being interposed between the check plug 23 and the one-way valve block 21, for pressing and positioning the one-way valve block 21. The return spring 17 intervenes between the check plug 23 and the bottom of the rotor 12. The rotor 12 is formed with a discharge hole 24 which opens to the plunger chamber 15. A one-way valve block 25 for discharge in the form of a ball is disposed on the discharge hole 24. The discharge hole 24 is formed with a valve seat on which the one-way valve block 25 is seated.

A valve block 27 is formed with a high-pressure chamber 28 which leads to the discharge hole 24 of the rotor 12. The valve block 27 is provided with a restriction member 29 projecting into the high-pressure chamber 28, the restriction member 29 serving to position the one-way valve block 25 in place. The valve block 27 is provided with an orifice member 31 having an orifice 30 which opens to the high-pressure chamber 28.

When the plunger 16 is in its intake stroke, the one-way valve block 21 located at the head of the plunger 16 is opened, allowing oil to flow through the low-pressure chamber 19, the intake passage 18 and the communication hole 20 into the plunger chamber 15. At that time, the one-way valve block 25 for discharge disposed on the discharge hole 24 closes, blocking up any backward flow of oil from the high-pressure chamber 28. When the plunger 16 is in its discharge stroke, the one-way valve block 25 on the discharge side is opened, permitting oil within the plunger chamber 15 to be fed through the discharge hole 24 and the high-pressure chamber 28 into the orifice 30. At that time, the one-way valve block 21 for intake closes, preventing oil from leaking through the communication hole 20 and the intake passage 18 into the low-pressure chamber 19.

A bearing retainer 34 is provided adjacent to and on the right side of the valve block 27. The bearing retainer 34 is fixedly press-fitted at its outer periphery into the housing 8 and is positioned by a snap ring 35. The bearing retainer 34 thereby rotates jointly with the housing 8. The bearing retainer 34 is formed with a through-hole 36 opening to the low-pressure chamber 19. Needle bearings 37 and 38 are interposed between the bearing retainer 34 and the valve block 27 and between the bearing retainer 34 and the main shaft 13, respectively. An oil seal 39 intervenes between the bearing retainer 34 and the main shaft 13, for preventing oil from flowing out. The bearing retainer 34 fixedly press-fitted into the housing 8 has an axially extending extension 34A whose outer periphery is provided with a rear bearing 47. The bearing retainer 34 is therefore supported via the rear bearing 47 on the differential gear case 4.

When a rotational secondary torque is transmitted to the propeller shaft 50 as indicated by an arrow A, the rotational secondary torque passes through the companion flange 1, the front bearing 3, the housing shank 2 and the housing 8 as indicated by arrows B, C, D and E, respectively, and enters the bearing retainer 34 as indicated by the arrow F. After having entered the bearing retainer 34, the rotational secondary torque is transmitted to the outside rear bearing 47 as indicated by an arrow G and acts by no means on the main shaft 13. Accordingly, the rotor 12 is not tilted relative to the main shaft 13, resulting in no moment acting to displace the rotor 12 apart from the valve block 27. This prevents any possible leakage through the gap between the valve block 27 and the rotor 12 as well as lowering of the torque. Thrust-up load also passes through the propeller shaft 50, the companion flange 1, the front bearing 3, the housing shank 2 and the housing 8 and enters the bearing retainer 34. Similarly, after having entered the bearing retainer 34, the thrust-up load is transmitted to the rear bearing 47 without acting on the main shaft 13. Therefore, any abrasion and noise will not occur between the bearing retainer 34 and the main shaft 13.

Following the bearing retainer 34, an accumulator piston 40 is axially slidably provided for absorbing any volume variations of oil arising from thermal expansion or contraction and defines an accumulator chamber 41. The accumulator chamber 41 opens to the low-pressure chamber 19 via the through-hole 36 of the bearing retainer 34. O-rings 42 and 43 are interposed between the accumulator piston 40 and the housing 8 and between the accumulator piston 40 and the bearing retainer 34, respectively. An accumulator retainer 44 is firmly secured at its outer peripheral end to the housing 8. A return spring 45 intervenes between the accumulator retainer 44 and the bottom of the accumulator piston 40. The opening of the main shaft 13 is provided with an oil groove 48 for lubrication and with a sealing member 49.

The operative functions will then be described. When there arises no rotational difference between the housing shank 2 having the cam face 9 and the rotor 12, the plunger 16 will not work, resulting in no torque transmission. At that time, the plunger 16 is pressed against the cam face 9 by the action of the return spring 17. Then, when there occurs a rotational difference between the housing shank 2 and the rotor 12, the plunger 16 in its discharge stroke is axially thrust in by the cam face 9 of the housing shank 2. Oil residing in the plunger chamber 15 presses the one-way valve block 25 for discharge seated on the valve seat of the discharge hole 24 in the rotor 12 to open the discharge hole 24, and enters the high-pressure chamber 28 of the valve block 27. At that time, the one-way valve block 21 for intake remains seated on the valve seat of the plunger chamber 15, closing the communication hole 20. Thus, oil within the plunger chamber 15 is prevented from leaking through the intake passage 18 into the low-pressure chamber 19. Oil displaced into the high-pressure chamber 28 is fed through the orifice 30 and the low-pressure chamber 19 into the intake passage 18. At that time, resistance of the orifice 30 causes a rise of oil pressure in the high-pressure chamber 28, the discharge hole 24 and the plunger chamber 15, resulting in the occurrence of a reaction force of the plunger 16. Rotation of the housing shank 2 against this plunger reaction force brings about torque, which is transmitted between the housing shank 2 and the rotor 12. Further rotation of the housing shank 2 causes an intake stroke in which the one-way valve block 21 for intake opens the communication hole 20 to allow oil within the low-pressure chamber 19 to flow through the intake passage 18 and the communication hole 20 into the plunger chamber 15, with the result that the plunger 16 returns along the cam face 9 of the housing shank 2.

Figure 11:
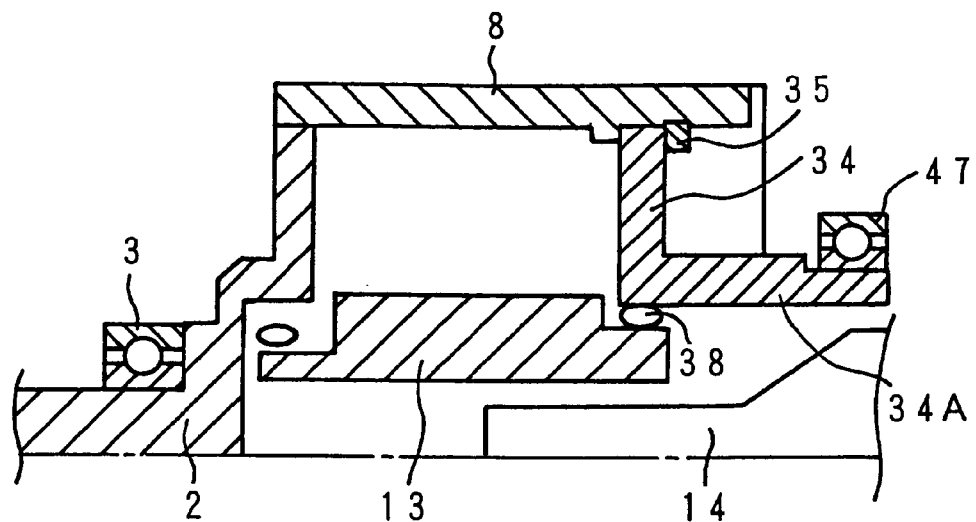
FIG. 11 illustrates in an extracted manner a mutual relationship among the input shaft, housing, rotor, main shaft and bearing retainer of FIG. 9.

Herein, as shown in FIG. 11 in an exclusive manner, the hydraulic power transmission joint of the present invention is provided with an axially extending extension 34A of the bearing retainer 34 fixedly press-fitted into the housing 8, the extension 34A having at its outer peripheral end the rear bearing 47 by way of which the bearing retainer 34 is supported on the differential gear case 4. This prevents the rotational secondary torque and the thrust-up load exerted on the housing shank 2 from acting on the main shaft 13.

Although the rotational secondary torque received by the propeller shaft 50 is transmitted through the companion flange 1, the front bearing 3, the housing shank 2 and the housing 3 and enters the bearing retainer 34, the rotational secondary torque received by the bearing retainer 34 enters the rear bearing 47. Therefore, no rotational secondary torque is transmitted to the main shaft 13. For this reason, any bending force arising from the reaction force from the differential gear case 3 will not act on the main shaft 13 and the rotor 12 will not be tilted relative to the main shaft 13. Thus, any moment separating the rotor 12 from the valve block 27 will not occur, resulting in no leakage of oil through the possible gap between the rotor 12 and the valve block 27 and hence in no lowering of the oil pressure. As a result, any torque reduction can be avoided.

After having entered the propeller shaft 50, the thrust-up load reaches the bearing retainer 34 by way of the same route, and the thrust-up load received by the bearing retainer 34 is transmitted to the rear bearing 47 without acting on the main shaft 13. This prevents any abrasions and noises from occurring between the bearing retainer 34 and the main shaft 13.

Figure 10:
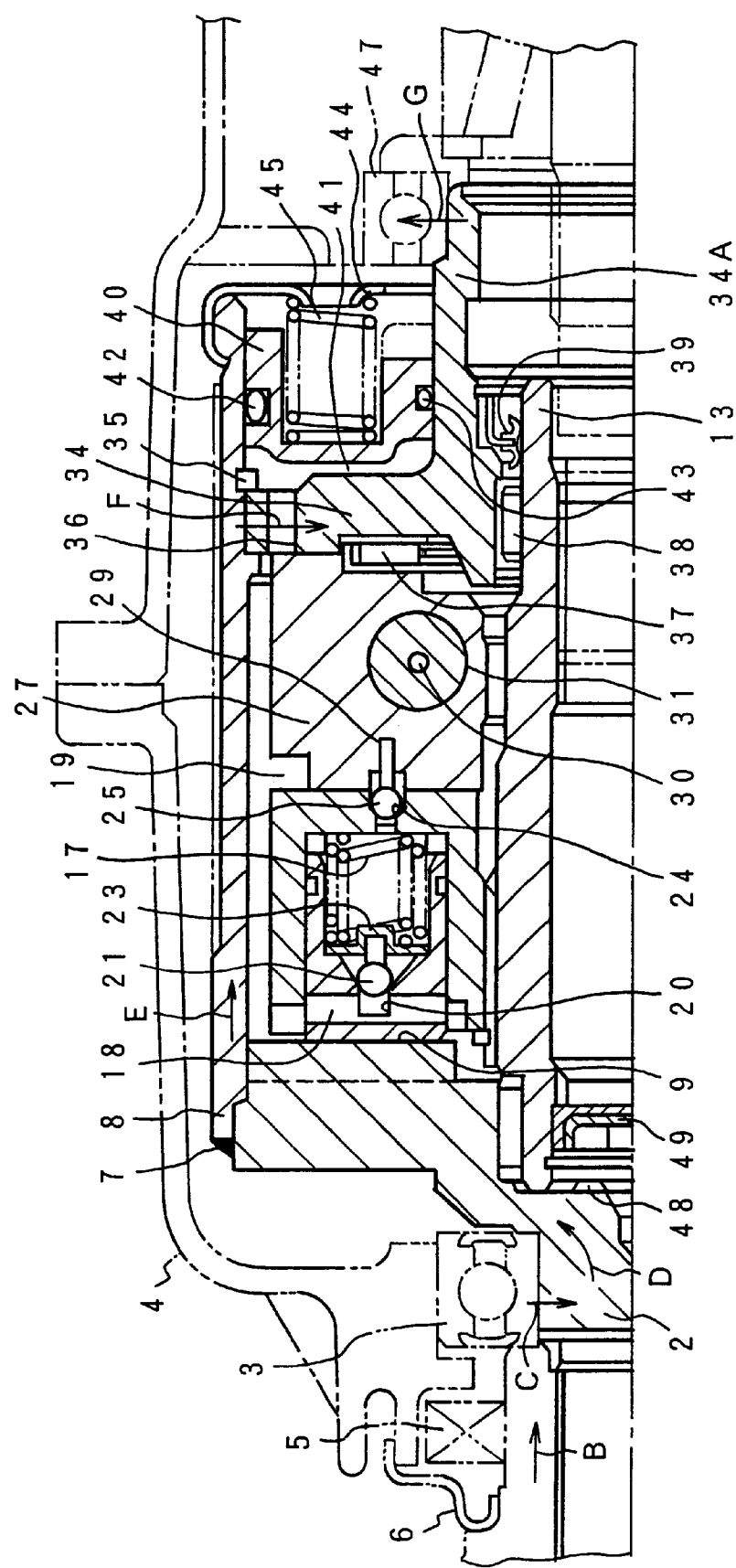
FIG. 10 is a sectional view of the major part of FIG. 9 in an enlarged scale.
Figure 12:
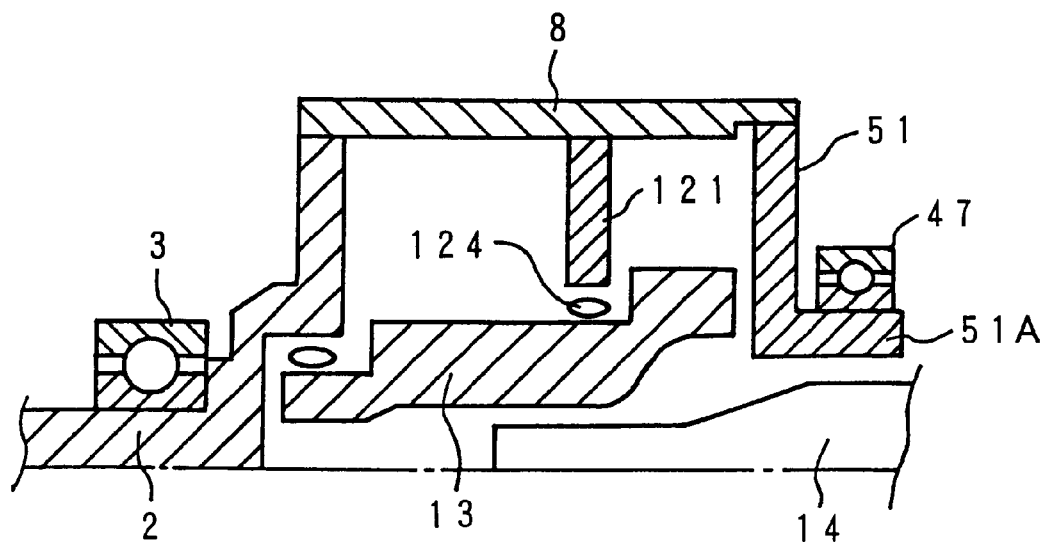
FIG. 12 illustrates in an extracted manner a mutual relationship among the input shaft, housing, rotor, main shaft and first and second bearing retainers of another embodiment of the present invention.

In an exclusive manner similar to FIG. 11, FIG. 12 illustrates the relationship among the flange, the rotor and the main shaft in another embodiment of the present invention. This structure is applied to the joint shown in FIGS. 9 and 10.

Figure 1:
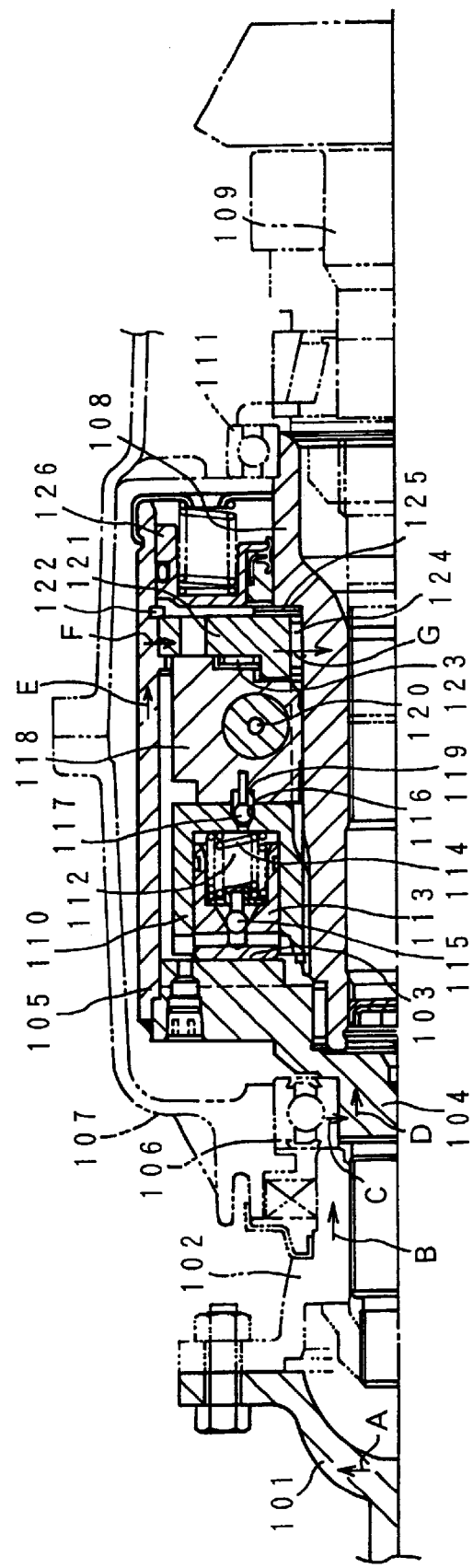
FIG. 1 is a half section of a hydraulic power transmission joint under development by the inventors of the present application.
Figure 2:
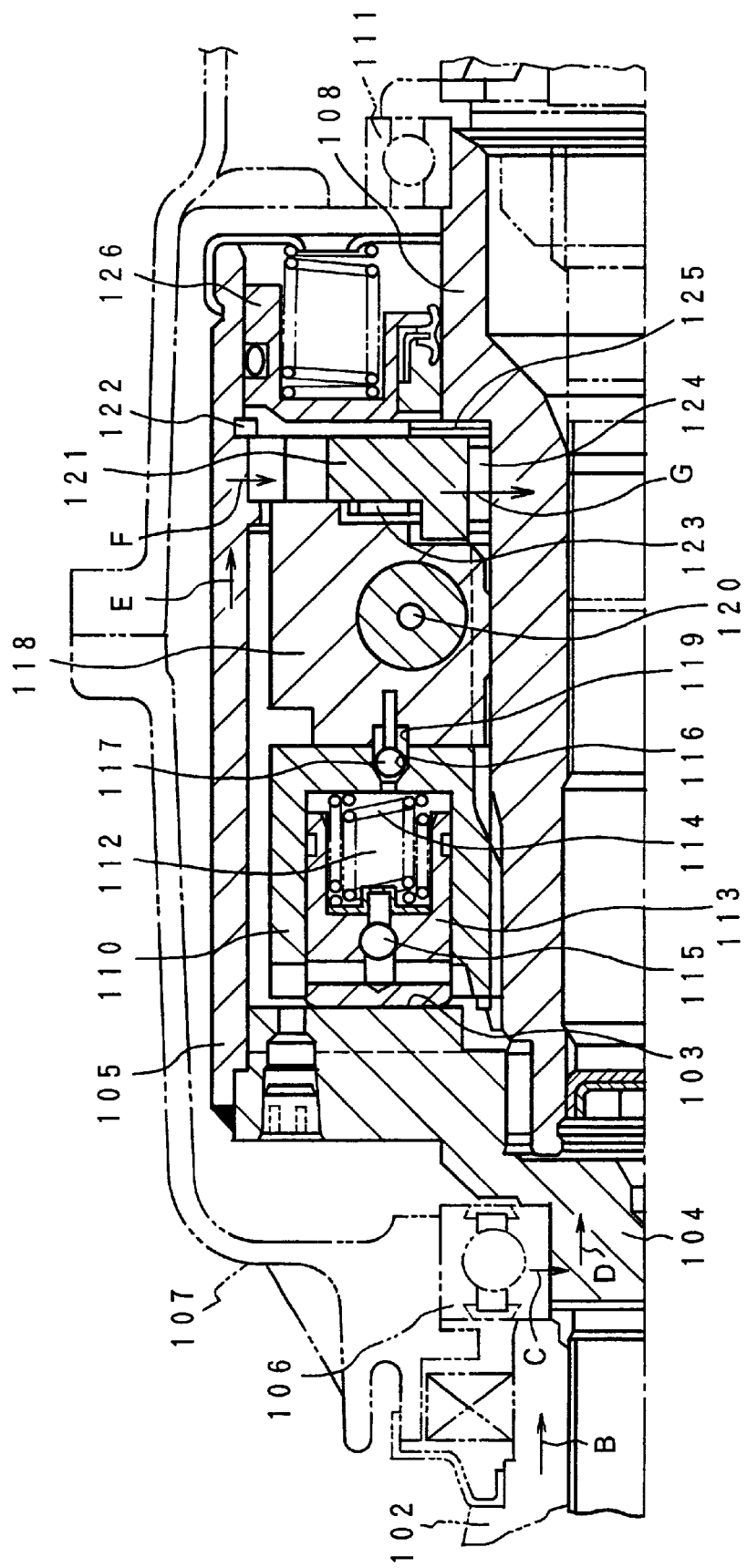
FIG. 2 is an enlarged section of the major part of FIG. 1.
Figure 3:
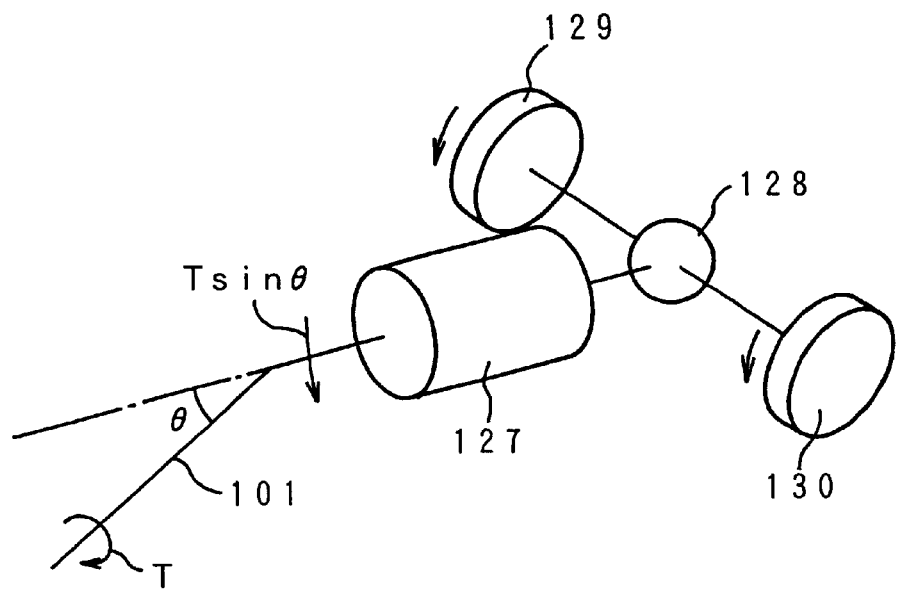
FIG. 3 is an explanatory diagram of the location of the joint and the rotational secondary torque.
Figure 4:
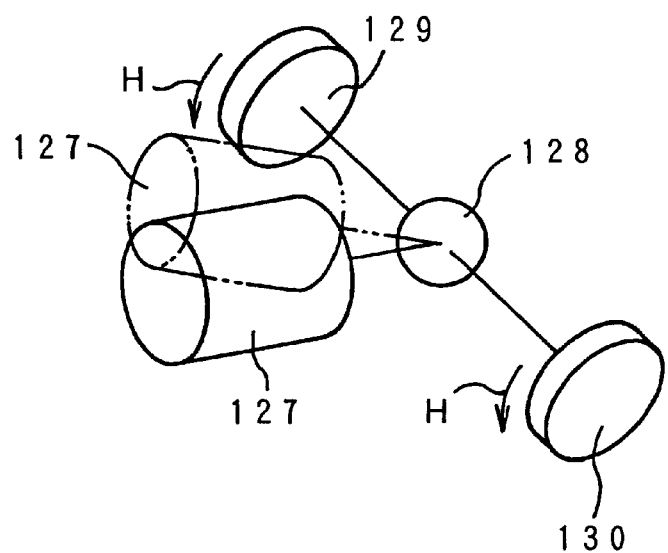
FIG. 4 is an explanatory diagram of a motion of the joint caused by the rotational secondary torque.
Figure 5:
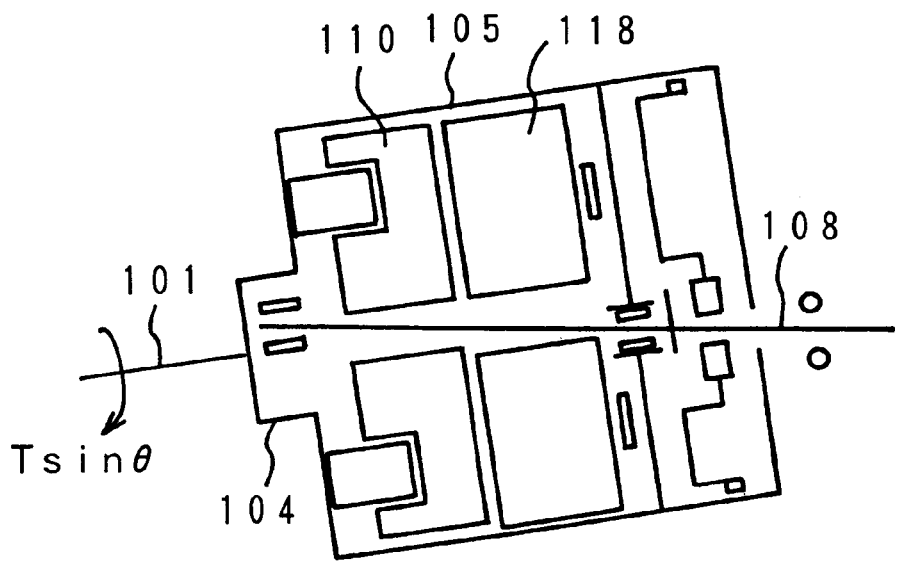
FIG. 5 is a diagrammatic view of a displacement between the input shaft and the output shaft which may occur within the joint by the motion of FIG. 4.
Figure 6:
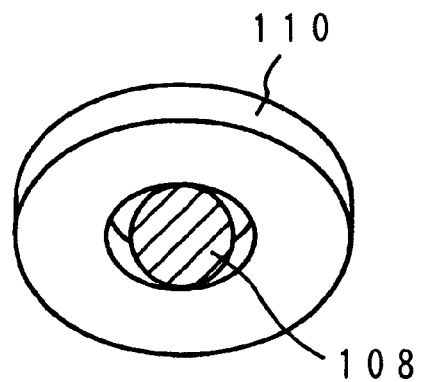
FIG. 6 is an explanatory diagram of a relationship between the rotor and the main shaft in the status of FIG. 5.
Figure 7:
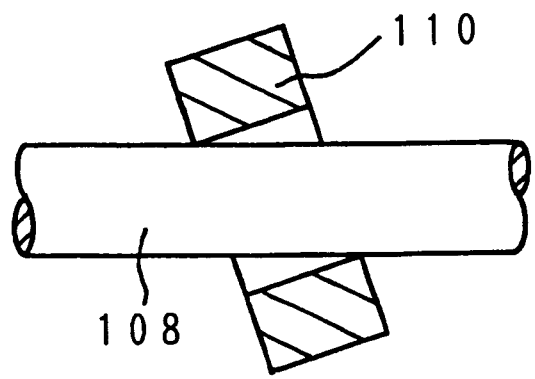
FIG. 7 is a fragmentary side elevational view partially in section, of the relationship of FIG. 6.
Figure 8:
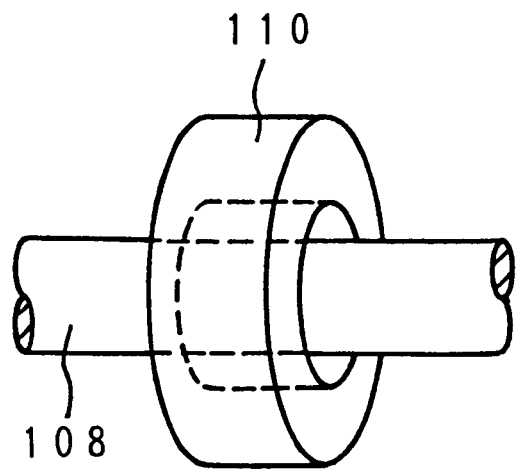
FIG. 8 is an explanatory diagram of a relationship between the rotor and the main shaft in the status of no application of the rotational secondary torque.

Referring to FIG. 12, the housing 8 is welded to the housing shank 2 coupled to the companion flange 1. On its outer periphery, the housing shank 2 is provided with the front bearing 3 by way of which the housing shank 2 is supported on the differential gear case 4. A first bearing retainer 121 identical to that of FIGS. 1 and 2 is fixedly press-fitted into the interior of the housing 8. A first needle bearing 124 is interposed between the first bearing retainer 121 and the main shaft 13. The first bearing retainer 121 is further followed by a second bearing retainer 51. The second bearing retainer 51 is fixedly press-fitted at its outer periphery into the interior end portion of the housing 8. An axially extending extension 51A is formed integrally with the inside of the second bearing retainer 51 and has at its outer peripheral end portion a rear bearing 47 acting as a second bearing. The second bearing retainer 51 is supported via the rear bearing 47 by the differential gear case 4.

Rotational secondary torque or thrust-up load input from the propeller shaft 50 passes through the companion flange 1, the front bearing 3, the housing shank 2 and the housing 8 and enters the second bearing retainer 51. After having entered the second bearing retainer 51, the rotational secondary torque or thrust-up load is transmitted to the rear bearing 47 without reaching the main shaft 13. In consequence, the rotor 12 is not tilted relative to the main shaft 13 by any means, resulting in no moment acting to displace the rotor 12 apart from the valve block 27. This prevents any possible leakage through the gap between the valve block 27 and the rotor 12 leading to a reduction of hydraulic pressure and prevents a lowering of the torque. Thrust-up load does not act on the main shaft 13, with the result that any abrasions and noises will not occur between the bearing retainer 34 and the main shaft 13.

Herein, an accumulator piston 126 is slidably provided as in FIGS. 1 and 2 between the first bearing retainer 121 and the second bearing retainer 51 of FIG. 12 so as to define an accumulator chamber 41 therebetween, the accumulator chamber 41 being in communication with a low-pressure chamber by way of the first bearing retainer 121. The other features are the same as those in FIGS. 1 and 2.

According to the present invention, as set forth hereinabove, the axially extending extension is formed on the bearing retainer provided adjacent to the valve block of the joint and press-fitted into the interior of the housing, with the differential gear case bearing being provided on the outer periphery of the extension so that the bearing retainer can be supported via the bearing by the differential gear case, whereby the rotor is prevented from becoming tilted relative to the main shaft in spite of reception of the rotational secondary torque, with the result that there occurs no moment acting to separate the rotor from the valve block, preventing any leakage of oil through the gap between the rotor and the valve block leading to a reduction of hydraulic pressure, as well as preventing any lowering of the torque. Furthermore, the thrust-up load is transmitted to the rear bearing and does not act on the main shaft, thereby making it possible to prevent any occurrence of abrasions and noises.

Also in cases where the second bearing retainer having the axially extending extension is further provided in addition to the first bearing retainer provided adjacent to the valve block and press-fitted into the interior of the housing, with the extension of the second bearing retainer having on its outer periphery the second bearing by way of which the second bearing retainer can be supported by the differential gear case, there can be prevented any oil leakage through the gap between the rotor and the valve block leading to a reduction of hydraulic pressure and thus to a lowering of torque, as well as any occurrence of abrasions and noises.

What is claimed is:

1. A hydraulic power transmission joint disposed between an input shaft and an output shaft which are capable of relative rotations, for transmitting torque depending on rotational-speed differences between said two shafts, said hydraulic power transmission joint comprising:

a housing coupled to said input shaft and having a cam face formed on the inner side of said housing;

a rotor coupled to said output shaft and rotatably housed in said housing, said rotor including a plurality of axially extending plunger chambers;

a plurality of plungers each accommodated reciprocatively under a pressing force of a return spring in each of said plurality of plunger chambers, said plurality of plungers being operated by said cam face upon relative rotations between said two shafts;

a discharge hole formed in said rotor so as to communicate with said plunger chambers;

a valve block having a high-pressure chamber which is in communication with said discharge hole, said valve block having an orifice which generates a flow resistance by the flow of oil discharged by the action of said plungers;

a bearing retainer provided adjacent to said valve block and having the outer periphery press-fitted into the interior of said housing, said bearing retainer having on its inside an extension which extends in the axial direction of said output shaft; and a bearing by way of which the outer periphery at the terminal end of said extension of said bearing retainer is rotatably supported on the internal side of a differential gear case.

2. A hydraulic power transmission joint according to claim 1, wherein said input shaft connecting with said housing is a propeller shaft extending from a front differential gear and wherein said output shaft connecting with said rotor is a main shaft fitted with a drive gear of a rear differential gear.

3. A hydraulic power transmission joint disposed between an input shaft and an output shaft which are capable of relative rotations, for transmitting torque depending on rotational-speed differences between said two shafts, said hydraulic power transmission joint comprising:

a housing coupled to said input shaft and having a cam face formed on the inner side of said housing;

a rotor coupled to said output shaft and rotatably housed in said housing, said rotor including a plurality of axially extending plunger chambers;

a plurality of plungers each accommodated reciprocatively under a pressing force of a return spring in each of said plurality of plunger chambers, said plurality of plungers being operated by said cam face upon relative rotations between said two shafts;

a discharge hole formed in said rotor so as to communicate with said plunger chambers;

a valve block having a high-pressure chamber which is in communication with said discharge hole, said valve block having an orifice which generates a flow resistance by the flow of oil discharged by the action of said plungers;

a first bearing retainer provided adjacent to said valve block;

a first bearing by way of which the inner periphery of said first bearing retainer is rotatably supported on said output shaft;

a second bearing retainer following said first bearing retainer and having the outer periphery press-fitted into the interior of said housing, said second bearing retainer having on its inside an extension which extends in the axial direction of said output shaft; and a second bearing by way of which the outer periphery at the terminal end of said extension of said second bearing retainer is rotatably supported on the internal side of a differential gear case.

4. A hydraulic power transmission joint according to claim 3, wherein said input shaft connecting with said housing is a propeller shaft extending from a front differential gear and wherein said output shaft connecting with said rotor is a main shaft fitted with a drive gear of a rear differential gear.

5. A hydraulic power transmission joint according to claim 3, further comprising an accumulator piston disposed between said first bearing retainer and said second bearing retainer, for absorbing a variation in volume arising from heat of oil.

* * * * *